US008893566B2

(12) United States Patent
Tychsen et al.

(10) Patent No.: US 8,893,566 B2
(45) Date of Patent: Nov. 25, 2014

(54) FLUID ROTARY MACHINE WITH A SENSOR ARRANGEMENT

(75) Inventors: Tom Tychsen, Graasten (DK); Dietmar Weiss, Aabenraa (DK)

(73) Assignee: Danfoss Power Solutions APS, Nordborg (DK)

( * ) Notice: Subject to any disclaimer, the term of this patent is extended or adjusted under 35 U.S.C. 154(b) by 515 days.

(21) Appl. No.: 13/070,600

(22) Filed: Mar. 24, 2011

(65) Prior Publication Data

US 2011/0236244 A1 Sep. 29, 2011

(30) Foreign Application Priority Data

Mar. 25, 2010 (DE) ........................ 10 2010 012 850

(51) Int. Cl.
*G01D 21/00* (2006.01)
*F03C 2/08* (2006.01)

(52) U.S. Cl.
CPC ............... *F03C 2/08* (2013.01); *F04C 2240/81* (2013.01); *F04C 2270/86* (2013.01); *F04C 2270/052* (2013.01)
USPC ........................................................ 73/866.5

(58) Field of Classification Search
None
See application file for complete search history.

(56) References Cited

U.S. PATENT DOCUMENTS 4,265,127 A * 5/1981 Onoda ....................... 73/861.78
4,316,144 A 2/1982 Levijoki
4,504,756 A 3/1985 Amano et al.
4,593,555 A 6/1986 Krutz et al.
5,119,898 A 6/1992 Eckhardt et al.
5,199,307 A * 4/1993 Onoda et al. ............... 73/861.78
5,933,795 A 8/1999 Schottler et al.
6,062,123 A 5/2000 Obata et al.
6,539,710 B2 4/2003 Draper
7,676,309 B2 3/2010 Tamaki et al.
8,554,411 B2 10/2013 Ura
2003/0042064 A1 3/2003 Takekawa et al.
2011/0186758 A1* 8/2011 Goldbeck et al. ............... 251/59

FOREIGN PATENT DOCUMENTS

| | | | |
|---|---|---|---|
| DE | 3912277 | A1 | 10/1990 |
| DE | 19547537 | C1 | 2/1997 |
| DE | 19824926 | A1 | 12/1999 |
| DE | 102004060198 | B3 | 3/2006 |
| DE | 102005036483 | B4 | 1/2008 |
| EP | 1231128 | A2 | 8/2002 |
| GB | 2 102 129 | * | 1/1983 |
| WO | 9967650 | A1 | 12/1999 |

* cited by examiner

*Primary Examiner* — Robert R Raevis
(74) *Attorney, Agent, or Firm* — McCormick, Paulding & Huber LLP

(57) ABSTRACT

The invention concerns a fluid rotary machine (1) with a housing (2), a shaft (3) led out of the housing (2) and a sensor arrangement (10) comprising a transmitter (12) in active connection with the shaft (3), and a receiver (15). It is endeavored to arrange the sensor arrangement in an advantageous manner on the fluid rotary machine. For this purpose, the sensor arrangement (10) comprises an accommodation area, in which the transmitter (12) is arranged, the accommodation area being in fluid connection with the inside of the housing (2) and sealed towards the outside, and the receiver (15) is arranged outside the housing (2) and the accommodation area.

12 Claims, 5 Drawing Sheets

FLUID ROTARY MACHINE WITH A SENSOR ARRANGEMENT

CROSS REFERENCE TO RELATED APPLICATIONS

Applicant hereby claims foreign priority benefits under U.S.C. §119 from German Patent Application No. 10 2010 012 850.3 filed on Mar. 25, 2010, the contents of which are incorporated by reference herein.

TECHNICAL FIELD

The invention concerns a fluid rotary machine with a housing, a shaft led out of the housing and a sensor arrangement comprising a transmitter in active connection with the shaft, and a receiver.

BACKGROUND OF THE INVENTION

Such a machine is known from U.S. Pat. No. 6,539,710 B2. The first section comprises an externally toothed gear wheel that interacts with an internally toothed ring. Pressure pockets are formed between the gear wheel and the ring, said pressure pockets being either provided with pressure fluid or connected to a low-pressure area via a rotary valve slide arrangement. The gear wheel is connected to the shaft via a cardan shaft. The gear wheel engages a crank pin that transfers the orbiting movement of the gear wheel to a sensor shaft.

U.S. Pat. No. 4,593,555 describes a hydraulic motor, in which a pressure sensor is used to determine the rotary speed of the shaft.

U.S. Pat. No. 6,062,123 describes an auxiliary force supported steering arrangement with a motor and a sensor that detects a position of a steering handwheel. The sensor is arranged radially to the axis of the steering handwheel.

DE 198 24 926 C2 describes a further hydraulic steering arrangement, in which the front side of an inner control slide is provided with a row of teeth, which can be detected by a sensor.

DE 10 2005 036 483 B4 describes a hydraulic rotary machine whose shaft is provided with a transmitter, which has on its outer circumference a toothed structure of teeth and grooves. In the housing is arranged a transmitter that directs a light beam to the threaded structure. From the threaded structure, the light beam is reflected to a receiver.

In many application areas of such machines, in particular hydraulic rotary machines, sensors are required in order to enable sufficiently accurate control of the machine, for example in connection with a connected diesel motor, with the purpose of saving energy.

The sensor arrangements in the machines as mentioned in the introduction have principally proven their value. However, in many cases they require a relatively complicated installation of the sensor. The sensor will then often be in a position, in which it is actually disturbing. If the sensor is arranged in a position, where it is less disturbing, there is a risk that it cannot directly determine the rotation of the shaft, but is connected to the shaft via several, play-susceptible engagement points. A similar problem occurs, when the shaft can be distorted, for example in connection with large torques within a movement chain.

SUMMARY OF THE INVENTION

The invention is based on the task of arranging the sensor arrangement in an advantageous manner on the fluid rotary machine.

With a fluid rotary machine as mentioned in the introduction, this task is solved in that the sensor arrangement comprises an accommodation area, in which the transmitter is arranged, the accommodation area being in fluid connection with the inside of the housing and sealed towards the outside, and the receiver is arranged outside the housing and the accommodation area.

In this embodiment, it is utilised in an advantageous manner that the accommodation seals the inside of the machine towards the outside, so that no opening is required at the sensor arrangement, through which a moving element is guided and which must then be sealed. If a sealing between moving parts can be saved, this improves the operation safety. The wear remains small and the fault susceptibility is reduced. If, for example, the sensor arrangement is connected to a hydraulic machine, hydraulic fluid can enter the accommodation area, thus lubricating at the same time the contact faces between the transmitter and the housing or another element. This again causes that the transmitter can rotate practically freely, so that an extremely small torque is required to rotate the transmitter. When using a transfer element, this again keeps the distortion of the transfer element small. A particularly simple embodiment provides arrangement of the accommodation area inside the housing. The accommodation area can be formed as an accommodation chamber.

Preferably, the accommodation area is formed in a front cover of the fluid rotary machine. Such an embodiment is particularly compact. The accommodation area can, for example, be a bore or a concavity in the front cover. A through bore will not be made. Otherwise, the tightness would no longer be guaranteed. Also here, an opening for guiding a movable element is not required for the sensor arrangement. The front cover or other parts of the housing can be made of stainless steel. Thus, an interaction between transmitter and receiver, if this interaction is caused by a magnetic field, will not be disturbed.

Preferably, the transmitter has a support element that interacts unfrictionally with the front cover. Thus, a liquid or a fluid with a lubricating effect will not be required in the accommodation area. Due to the unfrictional interaction of front cover and support element, the sensor arrangement can also be used as such.

Preferably, the sensor arrangement comprises a sensor housing, in which the accommodation area is arranged. In this embodiment, the sensor housing is sealing the inside of the machine towards the outside. Also in this case the sensor arrangement requires no opening for a movable element, which opening would have to be sealed. The sensor housing can be made as a separate component. Firstly, this simplifies the manufacturing. Secondly, this makes it easy to adapt the sensor housing particularly well to the requirements of the sensor arrangement, particularly those of the transmitter.

Preferably, the transmitter has a support element that interacts unfrictionally with the sensor housing. In this case, the sensor arrangement can also be used, when a liquid or a fluid that enters the accommodation area has no lubricating properties, which is, for example, the case with water hydraulic machines.

Preferably, the sensor housing is screwed into a front cover of the machine. For this purpose, the sensor housing has, for example, an outer thread that engages a corresponding inner thread in the front cover. This simplifies the manufacturing of the sensor housing and the mounting of the sensor arrangement on the machine. Further, with this embodiment it is relatively simple to seal the accommodation chamber towards the outside. A sealing simply has to be arranged between the sensor housing and the front cover and the sensor housing must be screwed into the front cover with the sufficient force.

Preferably, the receiver is clamped onto the sensor housing. Thus, the receiver is connected to the sensor housing by means of a detachable connection that can be made and detached again relatively quickly. This has the advantage that by replacing the receiver, the machine can relatively easily be provided with different kinds of sensor arrangements. Also repair work is simplified. In a sensor arrangement the receiver is usually the most fault-susceptible part.

Preferably, the transmitter comprises a magnet. The magnet generates the magnetic field that can still also be measured at the receiver. The magnetic field merely has to amount to a few millitesla. If the magnet itself is moved because of a movement of the transmitter caused by the shaft, this causes a change of the magnetic field at the location of the receiver. It is also possible to arrange several magnets at the transmitter. Due to the varying magnetic field, the receiver can then make conclusions with regard to the movement of the transmitter and thus of the shaft. If the transmitter comprises a magnet, the sensor housing is expediently made of a material that is non-magnetic, so that the magnetic field at the receiver remains undisturbed.

Preferably, the receiver comprises a magneto-resistive or a Hall sensor element. A magneto-resistive element changes its electrical resistance, when an external magnetic field is placed. This can then be read out. A Hall sensor element supplies, when a current flows through it, an output voltage that is proportional to a vertical component of the magnetic field and the current. This means that, as opposed to a coil-magnet arrangement, also with a non-moving magnet a current can always be read out.

Preferably, transmitter and receiver are elements of a Hall, rotation, tacho-generator or optical sensor. With all those sensors, the rotary movement of the shaft that is in active connection with the transmitter can be detected. In the case of the Hall sensor the transmitter comprises a magnet and the receiver comprises a Hall sensor. The tacho-generator supplies a voltage that is proportional to the speed. In the case of the optical sensor, an LED can scan the transmitter through a transparent sensor housing.

Preferably, the sensor arrangement comprises an output element that supplies a rectangle signal. However, the output element can also supply an analogue current signal, which particularly varies between 2 milliampere and 20 milliampere. Alternatively, an analogue voltage signal can be supplied, which typically varies between 0.1 Volt and 0.9 Volt. However, a rectangle signal has the advantage of being less noise sensitive. For example, a TTL signal can be chosen as rectangle signal.

Preferably, the sensor arrangement has a memory that can store at least two values. Storing of two values in the memory can particularly be used to detect a rotation direction of the shaft. For example, two values stored at different times can firstly be normalised and then used to calculate a speed in consideration of the transition from 360° to 0°.

BRIEF DESCRIPTION OF THE DRAWINGS

In the following, the invention will be described on the basis of preferred embodiments in connection with the drawings, showing.

DETAILED DESCRIPTION OF THE PREFERRED EMBODIMENT

In the following, the invention is described on the basis of a hydraulic motor as an example of a fluid rotary machine. However, the invention is not limited to hydraulic motors.

Figure 1:
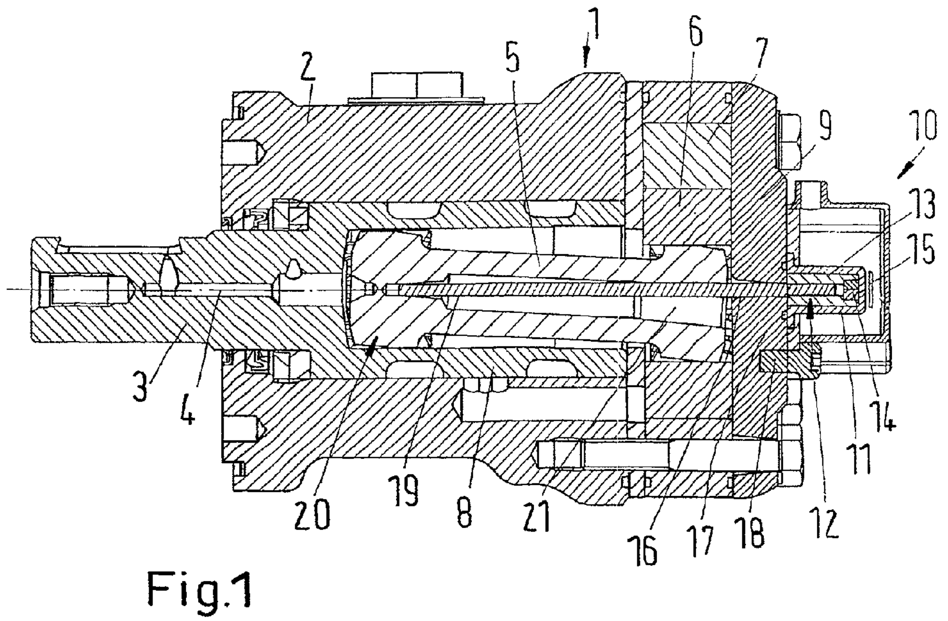
FIG. 1 is a hydraulic motor as an example of a fluid rotary machine.

A hydraulic motor 1 as shown in FIG. 1 comprises a housing 2, from which a shaft 3 is led out. A mechanical output can be taken from the shaft 3.

The shaft 3 is rotatable around an axis 4. The shaft 3 forms part of a movement chain that also comprises a cardan shaft 5 and an externally toothed gear wheel 6 that is arranged in an internally toothed ring 7 to form pressure pockets as known per se, which can, in dependence of their position, be supplied with hydraulic fluid under pressure or release hydraulic fluid to a low-pressure connection. For the control of the fluid supply to these pressure pockets a schematically shown control slide 8 is provided that is connected to the shaft 3.

Thus, with the gear wheel 6, the movement chain has a first section that orbits around the axis 4. Further, in the area of the shaft 3, the movement chain has a second section that rotates around the axis 4.

On the side opposite the shaft, the housing 2 is closed by a front cover 9. A sensor arrangement 10 is arranged on the outside of the front cover 9. However, the sensor arrangement 10 can also, at least partly, be arranged in the housing 2 or in the front cover. The sensor arrangement 10 is supposed to detect the rotation of the shaft 3 as accurately as possible.

The sensor arrangement 10 comprises a sensor housing 11 that surrounds an accommodation area, in which a transmitter 12 is arranged. The accommodation area can be formed as an accommodation chamber. The transmitter 12 comprises a support element 13 that is formed of a material, which interacts unfrictionally with the material of the sensor housing 11. One or more transmitter elements is/are arranged on the support element. In the present embodiment, the transmitter elements 14 are made as magnets 29 or as permanent magnets. On the outside of the sensor housing 11 is arranged a receiver 15 that is acted upon by the magnetic field of the transmitter elements 14, and which passes on electrical signals containing the information about the rotary movement of the shaft 3, either through a line that is not shown in detail or wirelessly, to a control that is not shown in detail.

The front cover 9 has a centrally arranged through opening 16. Via the through opening 16, the inside of the housing 2 is in contact with the accommodation area of the sensor housing 11, so that hydraulic fluid from the inside of the housing 2 can also penetrate into the inside of the sensor housing 11. Between the sensor housing 11 and the front cover 9 is arranged a sealing 17, so that the hydraulic fluid cannot penetrate to the outside. The required sealing forces are provided by a fixing arrangement, with which the sensor housing 11 is fixed to the front cover 9. Here, this fixing arrangement is symbolised by a screw 18. In practice, several screws 18 are provided.

The sensor housing 11 is made of a material that is non-magnetic and permits passage of the magnetic field from the transmitter elements 14, so that this magnetic field can be detected by the receiver 15.

Instead of using a sensor housing 11, the accommodation area can also be located in the front cover 9. It is also possible to arrange the accommodation area differently in the housing.

If location of the accommodation area in the front cover is wanted, a non-through opening or a concavity will be provided instead of the through opening 16. In this manner, the tightness is also guaranteed without the sensor housing 11. Also in this case, the transmitter 12 can comprise a support element 13. It is advantageous for the support element 13 to interact unfrictionally with the front cover 9. When, in the following, or in the above, the transmitter 12 is described in the sensor housing 11, it is always possible, as an alternative that the transmitter is generally placed in the accommodation area and particularly in the housing 2 or in the front cover 9.

Via a transfer element 19, the support element 13 is connected to a second section of the movement chain that rotates around the axis 4. This is the end of the cardan shaft 5 that engages the shaft 3 via a toothed geometry 20.

The transfer element 19 is formed as a speedometer cable, that is, it is torsionally rigid. The driving of the transmitter 12, which is additionally lubricated by the hydraulic fluid in the accommodation area or the sensor housing 11, requires practically no torque, so that the transfer element 19 is practically not stressed by torsion. Thus, with a high accuracy, the transmitter 12 has always exactly the same rotation angle position as the shaft 3. The deviation is maximum 5°, preferably even only maximum 2° and in particularly preferred cases maximum 1°.

In order that the transfer element 19 can be led to the transmitter 12, the cardan shaft comprises a channel 21 that also passes through the first section of the movement chain. The gear wheel 6 turns with the same speed as the cardan shaft 5 and thus with the same speed as the transfer element 19. In the channel 21 there will thus not be any relative movement between the transfer element 19 and the cardan shaft 5 in the rotation direction. If the diameter of the channel 21 is too small to permit the transfer element 19 the necessary free space over a full rotation, the transfer element 19 will be exposed to a bending movement, which is, however, uncritical.

Instead of a speedometer cable, also another transfer element can be used, for example a thin metal stick or the like.

In certain cases, the embodiment according to FIG. 1 will experience a deviation between the angle position of the shaft 3 and the angle position of the transmitter 12 caused by a play in the toothing geometry 20.

Figure 2:
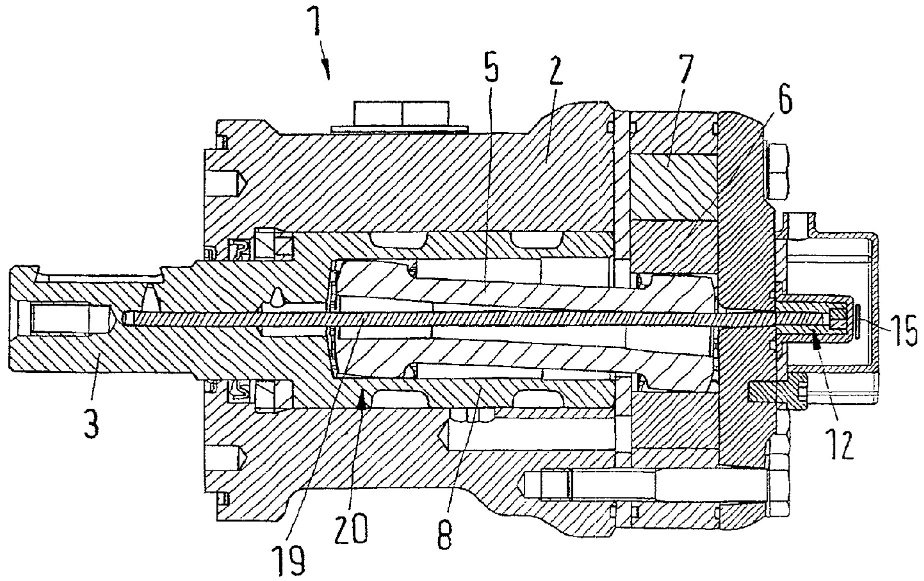
FIG. 2 is a second embodiment of a hydraulic motor.

In order to remedy this deviation, an embodiment as shown in FIG. 2 can be used. Here, the same elements are provided with the same reference signs.

The transfer element 19 is made longer than in the embodiment according to FIG. 1, so that it can be fixed directly in the shaft 3. Then, a possible play in the toothing geometry 20 will no longer have any influence.

In both cases, the transfer element 19 is unrotatably connected to the transmitter 12 and/or the shaft 3, however, being displaceable in a direction parallel to the axis 4. This can, for example, be achieved in that the ends of the transfer element 19 have a polygon-like cross-section, for example in the shape of a square. These ends of the transfer element 19 are then led into corresponding openings in the transmitter 12 and/or the shaft 3, said openings having a corresponding polygon-like cross-section. Thus, to a certain degree, the ends can be axially displaced into the openings, so that a longitudinal change of the transfer element can be accommodated, which could, for example, occur because of a temperature change.

FIG. 3 shows a further hydraulic machine. The same elements as in FIGS. 1 and 2 have the same reference signs.

Also here, the shaft 3 is connected via a toothing geometry 20 to the cardan shaft 5, which again is connected via a second toothing geometry 22 to the gear wheel 6. A second cardan shaft 23 is provided to connect the gear wheel 6 to the valve slide 8 that rotates together with the shaft 3 in order to fill hydraulic fluid from the right position into the pressure pockets formed between the gear wheel 6 and the toothed ring 7.

One end of the transfer element 19 is connected to the shaft 3 and the other end to the transmitter 12. Accordingly, with a high accuracy, the transmitter 12 has the same angle position as the shaft 3. Play in the toothing geometries 20, 22 has no influence here.

Figure 3A:
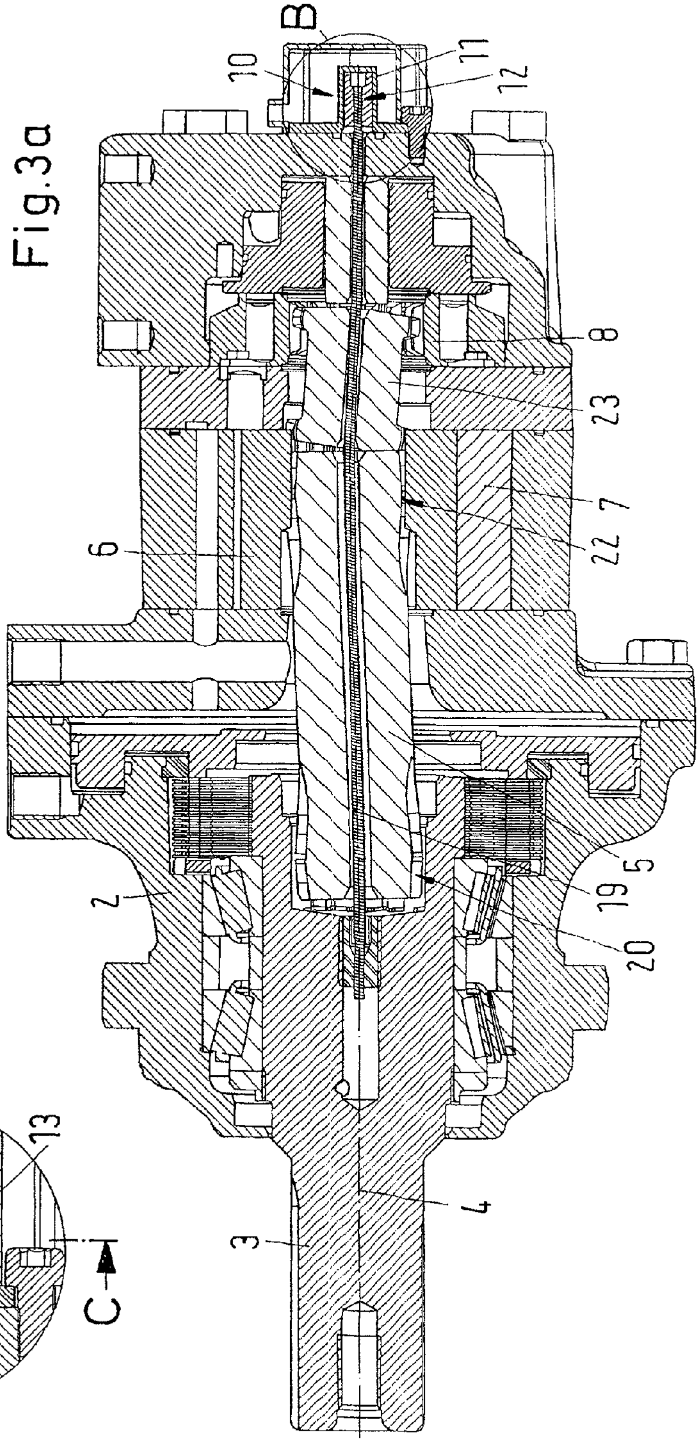
FIGS. 3*a*-3*c* are a third embodiment of a hydraulic motor.
Figure 3C:
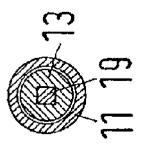
Figure 3B:
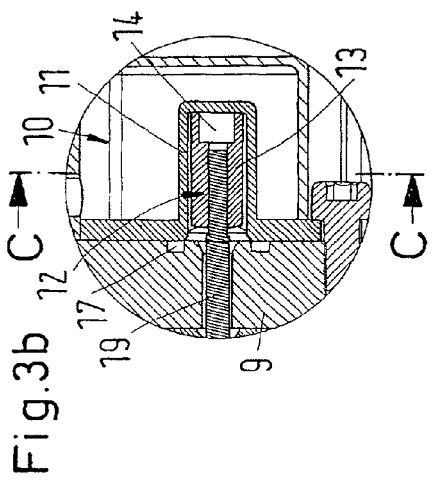

FIG. 3*b* is an enlarged view of a detail B in FIG. 3*a*, namely the sensor arrangement 10. FIG. 3*b* shows a section C-C according to FIG. 3*c*. From that it appears that the end of the transfer element 19 that is accommodated in the support element 13 has a square cross-section and the support element 13 has a corresponding opening.

The sensor housing 11 is, for example, made of stainless steel and the support element 13 of a plastic material, preferably PEEK (polyetheretherketone).

Instead of magnets 29, other elements can be used as transmitter elements 14.

If, for example, the sensor housing 11 is penetrable of a radiation, for example an optical radiation, the transmitter element 14 can also comprise an optical marking that can be detected from the outside through the sensor housing 11. The radiation does not necessarily have to be a visible radiation. Possible is also the use of a radiation in the infrared or ultraviolet range. Also other electromagnetic waves can be used for the signal transmission from the transmitter 12 to the outside, if they are able to penetrate the sensor housing 11.

The sensor housing 11 is sealed in relation to the front cover 9 by means of the sealing 17. Accordingly, hydraulic fluid can still penetrate into the inside of the sensor housing 11, but not to the outside. The sensor housing 11 is dimensioned so that it can adopt forces occurring inside the housing 2. However, sealings are not required to seal moving parts in relation to each other in the area of the sensor arrangement 10.

Figure 4A:
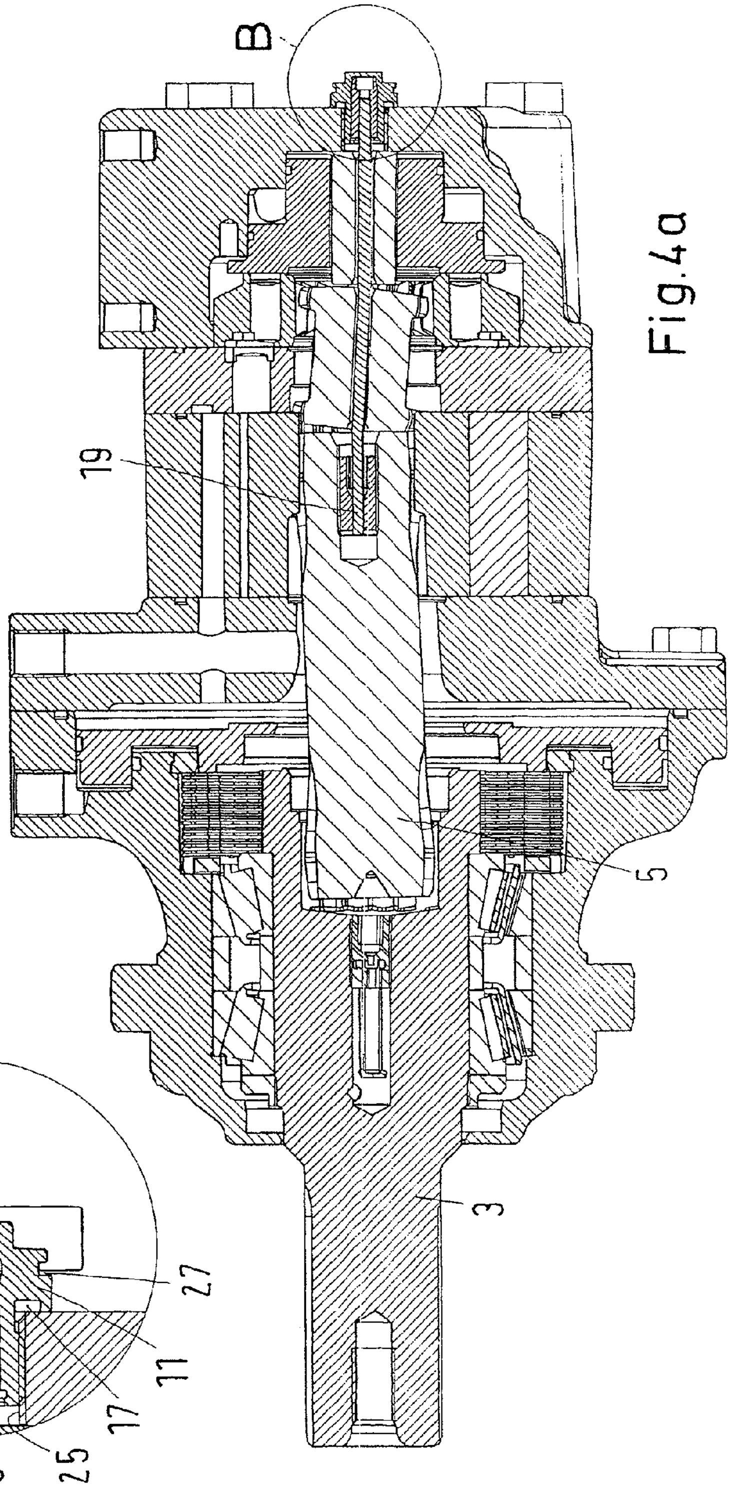
FIGS. 4*a*, 4*b* are a fourth embodiment of a hydraulic motor.

FIG. 4*a* shows an embodiment very much like the one in FIG. 3*a*. The same elements have the same reference signs.

Substantially, two changes appear:

Firstly, the transfer element 19 is connected to the cardan shaft 5 at the end facing away from the shaft 3. Thus, in this area the transfer element 19 is arranged eccentrically. However, the knowledge is utilised that the cardan shaft 5 rotates with the same speed as the shaft 3, and it is therefore basically insignificant, whether the transfer element 19 is fixed to a rotating and orbiting section of the cardan shaft 5, as in FIG. 1, or to a merely rotating section of the cardan shaft 5. The only condition is that during operation the transfer element 19 is only stressed by bending to an extent that it can manage at length.

Figure 4B:
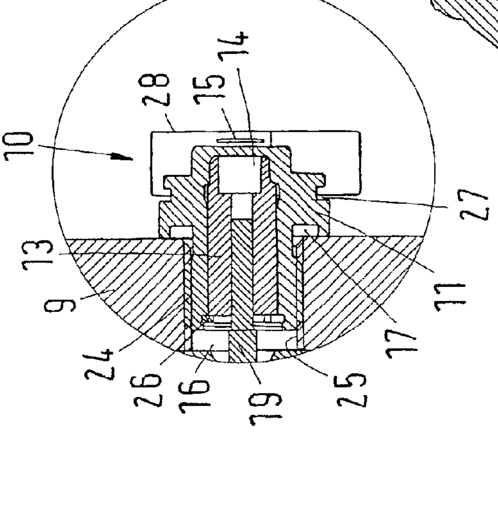

A second difference concerns the sensor arrangement 10 that is shown in an enlarged view in FIG. 4*b*.

The sensor housing 11 has an outer thread 24 that is screwed into an inner thread 25 in the through opening 16 in the front cover 9. This simplifies both the manufacturing of the sensor housing 11 and the mounting of the sensor housing 11. The sensor housing 11 can be made as a turned part. The mounting simply occurs in that the sensor housing 11 is screwed into the front cover 9, this screw mounting making the sealing 17 seal between the front cover 9 and the sensor housing 11.

The support element 13 is held in the sensor housing 11 by means of a lock ring 26. The transfer element 19 projects through the front cover 9, so that the support element 13 that is premounted in the sensor housing 11 can be fitted on the transfer element 19 before the sensor housing 11 is screwed into the front cover 9.

The sensor housing 11 has a groove 27 on its outer circumference. A clamp 28, only shown schematically, is inserted in the groove 27. This clamp 28 fixes the receiver 15 on the front side of the sensor housing 11. In this way, the receiver 15 is easily mounted, but also easily replaced.

Figure 5C:
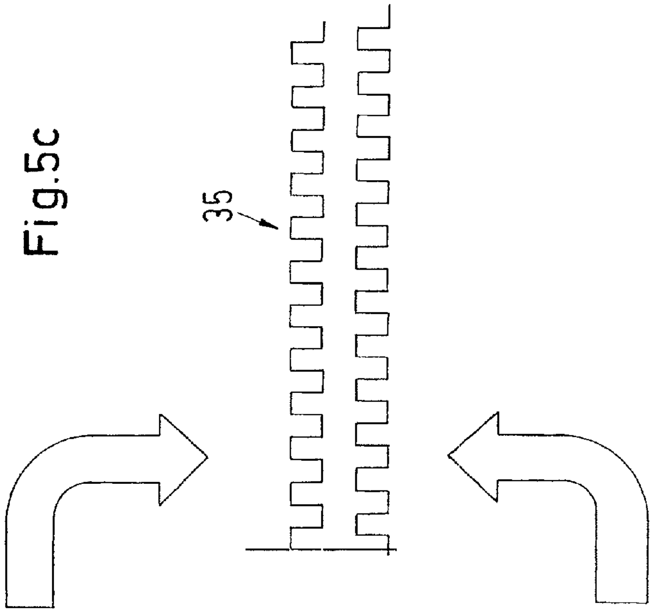
FIGS. 5*a*-5*c* are presentations of an output signal from a sensor arrangement.
Figure 5A:
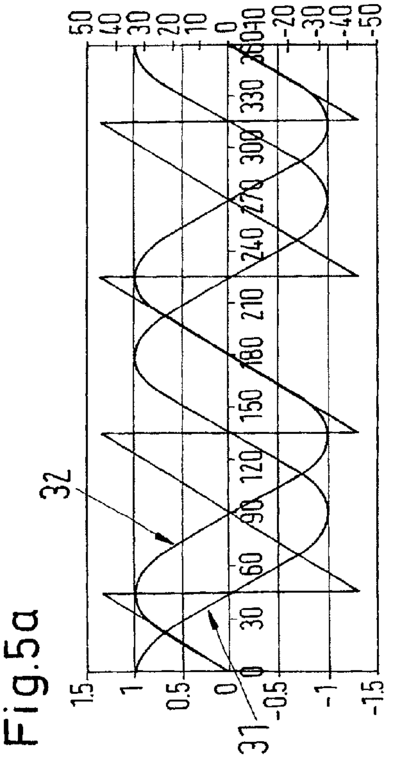
Figure 5B:
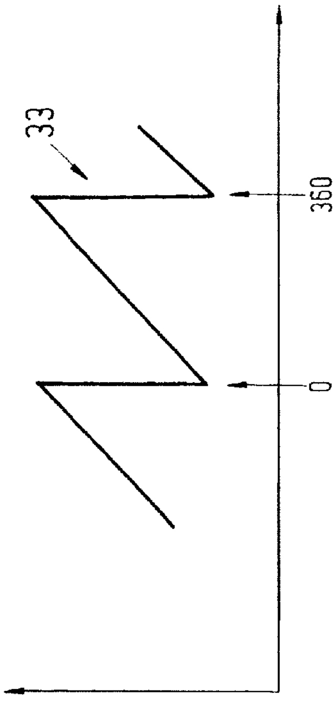

A magneto-resistive or a Hall sensor element 30 can be used as receiver 15. This is particularly the case, when the transmitter 12 is a magnet 29. Magneto-resistive sensor elements 30 can comprise Wheatstone bridges putting out a signal, by means of which the angle position of the shaft 3 or the transmitter 12 being actively connected to the shaft 3 can be measured. In particular, two output signals 31 and 32 can be a sine or a cosine, as shown in FIG. 5*a*. By means of these two output signals 31, 32, the angle can then be determined. In FIG. 5*a*, normalised output signals 31, 32 are shown as a function of the angle. In the case of the Hall sensor element 30, a sawtooth voltage 33 will often be put out. In FIG. 5*b* the sawtooth voltage is shown as a function of the time. At the points with the lowest voltage, the angles 0° and 360° can be found. When the receiver 15 comprises a magneto-resistive or a Hall sensor element 30 and the transmitter 12 comprises a magnet 29, the elements required for a Hall or rotary sensor 34 are available. Of course, also rotary sensors 34 of other types than a Hall sensor 34 can be imagined. Also completely different types of sensors 34 can be imagined. In particular, the previously mentioned optical sensor 34, with which the transmitter 12 is detected by means of electromagnetic waves, is a further opportunity. With a tacho-generator sensor 34, a voltage is supplied that is proportional to the speed.

The output signals 31, 32 or the sawtooth voltage 33 can be used and sent on for further processing. However, it is advantageous, if these signals are converted to a rectangle signal 35. Such a rectangle signal 35 represents a digital signal that can be recognised and used by a plurality of consumers. Voltage losses in connecting lines have no influence on a signal quality. The steepness of the flank typically varies between 5 ms and 50 ms, and usually at least 90 pulses per cycle are used. In order to convert the sine or cosine shaped output signals 31, 32 to the rectangle signal 35, the output signals 31, 31 are cut into segments with a prespecified frequency, said frequency depending on the desired solution.

Independently of a signal type, an output element 36 (FIG. 6) serves the purpose of putting out.

Figure 6:
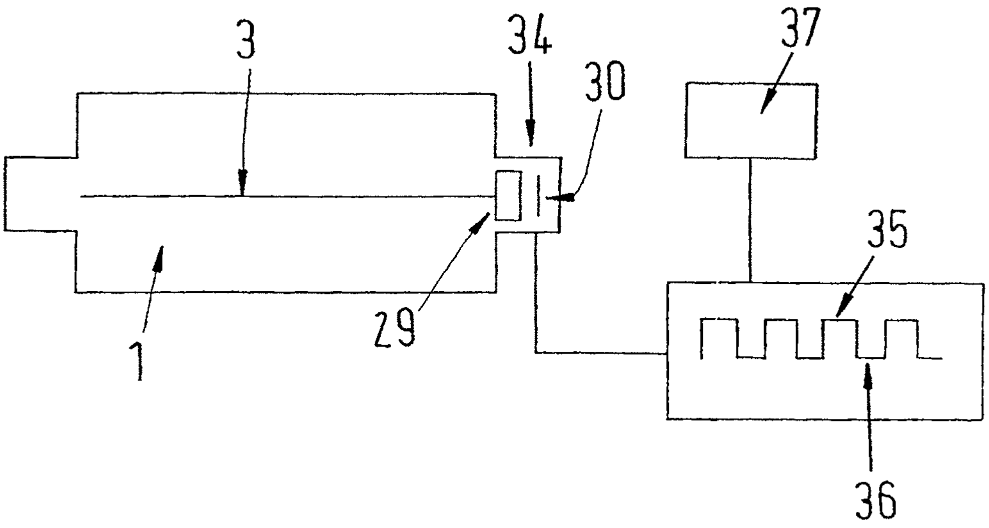
FIG. 6 is a schematic view of the fluid rotary machine with an output element and a memory.

In order to obtain also a rotation direction of the shaft 3, a memory 37, as shown in FIG. 6, can be used. The memory 37 then stores at least two values of the angle position of the shaft 3. For this purpose, it can use the sine or cosine shaped output signals 31, 32 or the sawtooth voltage 33. In consideration of the transition from 360° to 0°, the rotation direction will be put out together with the speed.

While the present invention has been illustrated and described with respect to a particular embodiment thereof, it should be appreciated by those of ordinary skill in the art that various modifications to this invention may be made without departing from the spirit and scope of the present.

What is claimed is:

1. A fluid rotary machine with a housing, a shaft led out of the housing and a sensor arrangement comprising a transmitter in active connection with the shaft, and a receiver, wherein the sensor arrangement comprises an accommodation area, in which the transmitter is arranged, the accommodation area being in fluid connection with the inside of the housing and sealed towards the outside, and the receiver is arranged outside the housing and the accommodation area.

2. The fluid rotary machine according to claim 1, wherein the accommodation area is formed in a front cover of the fluid rotary machine.

3. The fluid rotary machine according to claim 2, wherein the transmitter has a support element that interacts unfrictionally with the front cover.

4. The fluid rotary machine according to claim 1, wherein the sensor arrangement comprises a sensor housing, in which the accommodation area is arranged.

5. The fluid rotary machine according to claim 4, wherein the transmitter has a support element that interacts unfrictionally with the sensor housing.

6. The fluid rotary machine according to claim 4, wherein the sensor housing is screwed into a front cover of the fluid rotary machine.

7. The fluid rotary machine according to claim 1, wherein the receiver is clamped onto the sensor housing.

8. The fluid rotary machine according to claim 1, wherein the transmitter comprises a magnet.

9. A fluid rotary machine according to claim 1, wherein the receiver comprises a magneto-resistive or a Hall sensor element.

10. The fluid rotary machine according to claim 1, wherein transmitter and the receiver are elements of a Hall, rotation, tacho-generator or optical sensor.

11. The fluid rotary machine according to claim 1, wherein the sensor arrangement comprises an output element that supplies a rectangle signal.

12. The fluid rotary machine according to claim 1, wherein the sensor arrangement has a memory that can store at least two values.

* * * * *